United States Patent [19]

Sakuma

[11] Patent Number: 4,494,420
[45] Date of Patent: Jan. 22, 1985

[54] ROTARY-TO-LINEAR CONVERTER MECHANISM FOR A REMOTELY CONTROLLED REARVIEW MIRROR TILTING DEVICE OR THE LIKE

[75] Inventor: Toranosuke Sakuma, Shizuoka, Japan
[73] Assignee: Koito Seisakusho Co., Ltd., Tokyo, Japan
[21] Appl. No.: 344,477
[22] Filed: Feb. 1, 1982

[30] Foreign Application Priority Data
May 8, 1981 [JP] Japan .................. 56-69092
May 9, 1981 [JP] Japan .................. 56-69928

[51] Int. Cl.³ .................. G05G 11/00; F16M 11/12; A47G 1/24; G02B 5/08
[52] U.S. Cl. .................. 74/479; 350/633; 248/487; 248/184
[58] Field of Search .......... 74/89.15, 479, 424.8 R; 350/289; 248/487, 184, 185, 371

[56] References Cited

U.S. PATENT DOCUMENTS

| | | | |
|---|---|---|---|
| 2,292,309 | 8/1942 | Wellman et al. | 248/185 |
| 3,416,386 | 12/1968 | Pickles | 74/424.8 R |
| 3,972,597 | 8/1976 | Repay et al. | 350/289 |
| 4,076,392 | 2/1978 | Suzuki et al. | 350/289 |
| 4,202,603 | 5/1980 | Miyauchi | 350/289 |
| 4,324,454 | 4/1982 | Kumai | 350/289 |
| 4,365,867 | 12/1982 | Siefert | 350/289 |
| 4,403,829 | 9/1983 | Thujiuchi et al. | 350/289 |

FOREIGN PATENT DOCUMENTS

| | | | |
|---|---|---|---|
| 0059073 | 9/1982 | European Pat. Off. | 350/634 |
| 0153446 | 12/1979 | Japan | 350/634 |
| 0153447 | 12/1979 | Japan | 350/634 |
| 0140246 | 8/1982 | Japan | 350/289 |
| 0138442 | 8/1982 | Japan | 350/289 |

Primary Examiner—Allan D. Herrmann
Assistant Examiner—Michael J. Gonet
Attorney, Agent, or Firm—George B. Oujevolk

[57] ABSTRACT

A remotely controlled rearview mirror tilting device comprises two identical mechanisms, mounted within a housing, for converting the bidirectional rotation of motor-driven worms into rectilinear reciprocation of plungers in order to tilt a mirror holder relative to the housing about two orthogonal axes. Each rotary-to-linear converter mechanism comprises a hollow rotor integral with a worm wheel in mesh with one of the worms. The hollow rotor has an open end rotatably fitted in an opening in the housing and thereby restrained from axial displacement in one direction. For improved rainproofness and reduced frictional resistance the other end of the hollow rotor is closed and makes point contact with the housing via conical boss on either of the rotor and the housing. One of the plungers is mounted in the hollow rotor for simultaneous rotation therewith and for sliding motion in its axial direction. Projecting out of the open end of the rotor, one end of the plunger is coupled to the mirror holder via a ball-and-socket joint. The plunger is screw threaded and slidably engaged by a wire spring anchored to the housing, so that the bidirectional rotation of the rotor results in the rectilinear reciprocation of the plunger. An alternative embodiment is disclosed.

12 Claims, 6 Drawing Figures

ROTARY-TO-LINEAR CONVERTER MECHANISM FOR A REMOTELY CONTROLLED REARVIEW MIRROR TILTING DEVICE OR THE LIKE

BACKGROUND OF THE INVENTION

This invention pertains to a mechanism for transforming bidirectional rotation into rectilinear reciprocation, and more particularly to improvements in such a rotary-to-linear converter mechanism of the type used, for example, in a remotely controlled rearview mirror tilting device on a motor vehicle.

Automotive rearview mirror assemblies have been known which have a built-in, remotely controlled tilting device. Actuated by the driver seated in the vehicle, the tilting device automatically adjusts the angular orientation of the mirror, both vertically and horizontally, in order to give the driver an optimum vision of traffic activity to the rear of the vehicle. The rearview mirror tilting device usually incorporates two motor-driven worm gears associated with rotary-to-linear converter mechanisms for tilting the mirror about vertical and horizontal axes.

As heretofore constructed, each rotary-to-linear converter mechanism (shown in FIG. 1 of the accomanpying drawings) in a rearview mirror tilting device comprises a hollow rotor formed integral with the worm wheel of the worm gearing, and a plunger having a portion slidably extending axially through the rotor while being restrained from relative rotation. The plunger is screw threaded to travel axially in response to the rotation of the rotor. This known type of converter mechanism has some disadvantages. One is the easy intrusion of water, as of rain, into the housing of the tilting device through the gap between the contact surfaces of the hollow rotor and the plunger. Another is high frictional resistance offered to the rotation of the rotor by its bearing means.

SUMMARY OF THE INVENTION

The present invention seeks to make impervious to water or other foriegn matter the rotary-to-linear converter mechanism of the type defined. The invention also seeks to drastically reduce the frictional resistance to the rotor in the rotary-to-linear converter mechanism.

Stated broadly, the improved rotary-to-linear converter mechanism in accordance with the invention comprises a hollow rotor which is open at one end and closed at the other. The open end of of the hollow rotor is rotatably engaged in a circular opening in stationary means and thereby restrained from axial displacement in one direction. The closed end of the hollow rotor is rotatably held against the stationary means and so restrained from axial displacement in the opposite direction. Slidably mounted in the hollow rotor is a screw threaded reciprocator (plunger in the case of a rearview mirror tilting device or like applications) which is movable axially of the rotor. A means rotatable relative to the reciprocator is slidably engaged in its screw thread to cause its rectilinear reciprocation in response to the bidirectional rotation of the hollow rotor.

The reciprocator rotates with the hollow rotor in one embodiment of the invention and is locked against rotation in another. In the former case a wire spring anchored to the stationary means is slidably engaged in the screw thread of the reciprocator to cause its linear motion. In the latter case the reciprocator has its screw thread engaged by several circumferentially spaced claws formed integral with the hollow rotor.

One of the features of the invention resides in the closure of one end of the hollow rotor. Even if water passes between the sliding surfaces of the rotor and the reciprocator, the closed end of the rotor prevents the water from traveling further into the device incorporating this converter mechanism.

According to another feature of the invention the closed end of the hollow rotor makes point contact with the stationary means as via a conical boss on the stationary means or on the closed rotor end. The point contact materially reduces the total frictional resistance offered by the stationary means against the rotation of the hollow rotor.

The above and other objects, features and advantages of this invention and the manner of attaining them will become more apparent, and the invention itself will best be understood, from a study of the following description of some preferable embodiments illustrated in the attached drawings.

DETAILED DESCRIPTION

Figure 1:
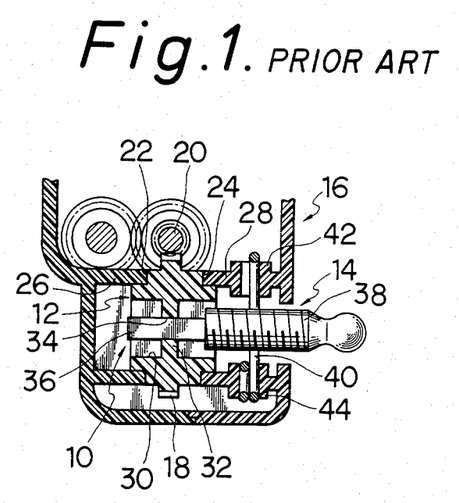
FIG. 1 is a sectional veiw of a typical prior art rotary-to-linear converter mechanism in a rearview mirror tilting device.

The peculiarity of the rotary-to-linear converter mechanism in accordance with the invention seems to call for an illustration and more detailed discussion of the pertinent prior art. FIG. 1 shows one such known rotary-to-linear converter mechanism as used in a rearview mirror tilting device. Generally designated 10, the converter mechanism comprises a rotor 12 and a reciprocator or plunger 14, both mounted within a housing 16 of the tilting device. The rotor 12 is formed integral with a worn wheel 18 in mesh with a motor-driven worm 20. The worm wheel 18 lies intermediate the opposite axial ends of the rotor 12, which is of generally cylindrical or tubular shape, and has a pair of oppositely directed, annular steps 22 and 24 formed on its opposite sides. These steps are also integral with the rotor 12. The housing 16 is formed to include a pair of opposed, annular bearing walls 26 and 28 for relative sliding engagement with the opposite ends of the rotor 12 and its steps 22 and 24. Thus is the rotor 12 rotatably supported by the bearing walls 26 and 28 and thereby locked against axial displacement in either direction.

The rotor 12 has a hollow 30 formed axially therethrough, and a wall 32 is formed across the hollow 30. The wall 32 has an opening 34 of square or otherwise polygonal shape formed centrally therethrough. An axial extension 36 of the plunger 14 slidably extends through the opening 34. The plunger extension 36 is of polygonal cross sectional shape corresponding to the shape of the opening 34. Consequently the plunger 14 is constrained to simultaneous rotation with the rotor 12 but is free to move axially relative to the rotor. The plunger 14 is screw threaded at 38. Slidably engaged in this screw thread is a wire spring 40 supported by retainers 42 and 44 integral with the housing 16.

Thus, with the rotation of the worm wheel 18 in mesh with the motor-driven worm 20, the rotor 12 and the plunger 14 rotate in coaxial relation thereto. Since the plunger 14 has its screw thread 38 engaged with the wire spring 40, the plunger on revolution moves axially in a direction depending upon its rotative direction, with its extension 36 sliding through the opening 34. Accordingly the bidirectional rotation of the rotor 12 is translated into the rectilinear reciprocation of the plunger or reciprocator 14. The plunger has its left hand end, as viewed in FIG. 1, pivotally coupled to a rearview mirror holder, not shown in this figure, for tilting same about one of two orthogonal axes.

This prior art rotary-to-linear converter mechanism has the two problems set forth previously. The improper waterproofness of the rearview mirror tilting device using the converter mechanism results from the fact that the hollow rotor is not completely closed. Rainwater or the like is easy to intrude into the housing 16 through the clearance between the rotor wall 32 and the plunger extension 36. Water intrusion into the housing of the tilting device is detrimental to its operation since the housing contains electric motors. The other problem, frictional resistance to the rotor 12, arises because the rotor has its opposite stepped ends both engaged in the annular bearing walls 26 and 28 of the housing 16. As will be seen from its preferable embodiments disclosed hereinbelow, the present invention overcomes both of these problems of the prior art.

Figure 2:
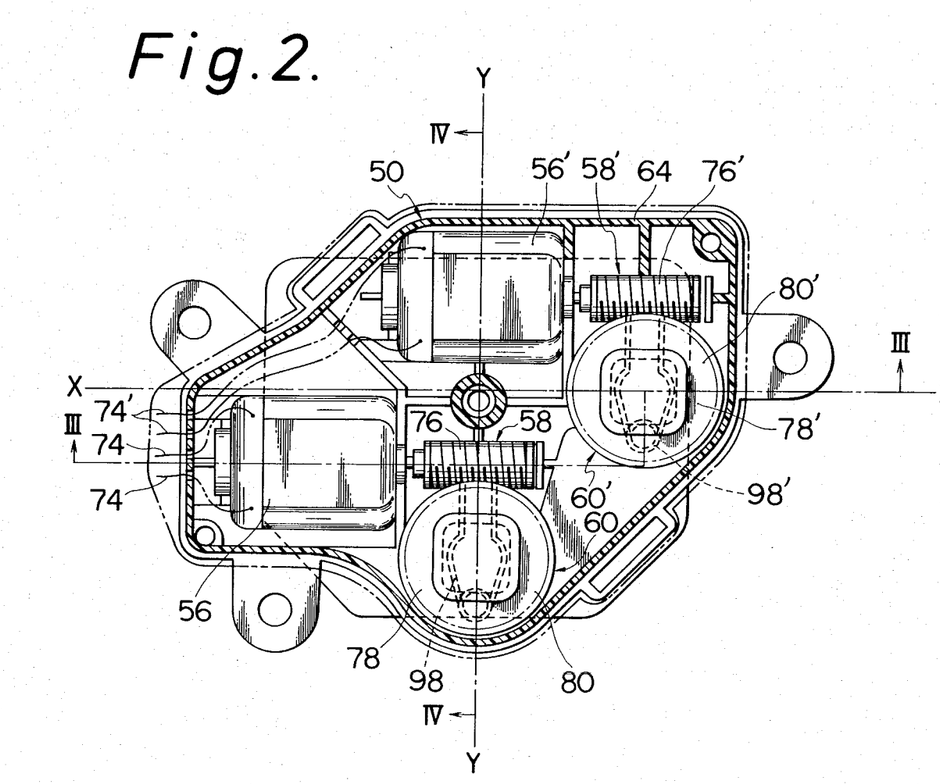
FIG. 2 is a sectional veiw of a rearview mirror tilting device incorporating two rotary-to-linear converter mechanisms each constructed in accordance with the present invention, the section being taken along the line II—II of FIG. 3.
Figure 3:
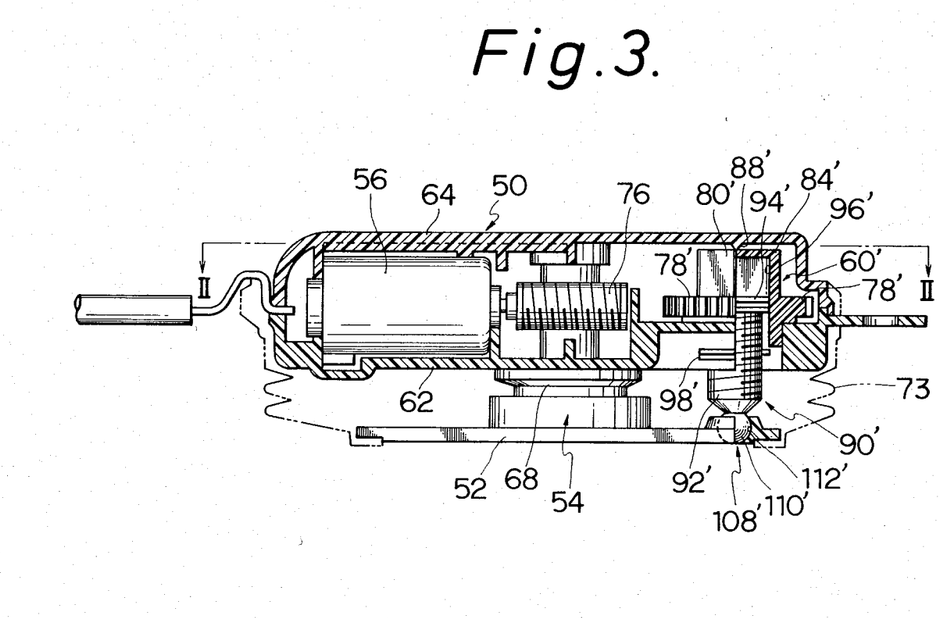
FIG. 3 is a sectional view of the tilting device taken along the line III—III of FIG. 2.
Figure 4:
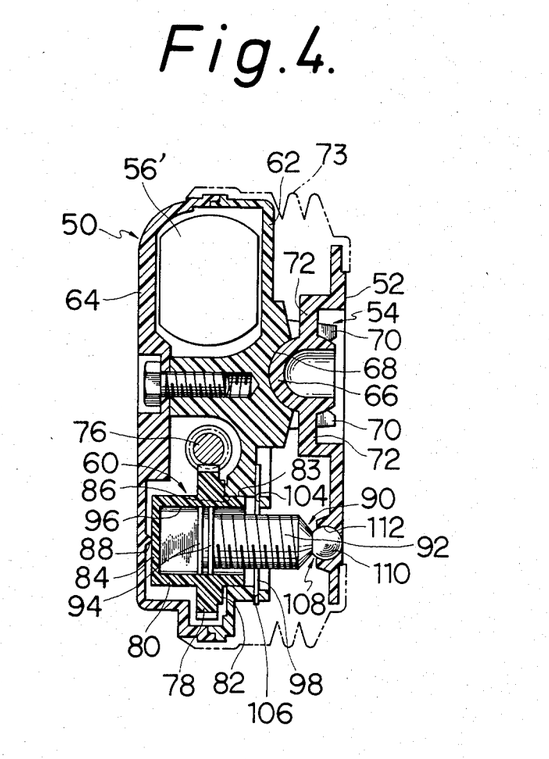
FIG. 4 is a sectional view of the tilting device taken along the line IV—IV of FIG. 2.

FIGS. 2 through 5 illustrate one such embodiment of the invention as adapted for a rearview mirror tilting device. With reference generally to FIGS. 2 through 4 the illustrated tilting device broadly comprises:

1. A housing 50.
2. A mirror holder 52 holding a rearview mirror, not shown, and pivoted to the housing 50 via a ball-and-socket joint 54.
3. First 56 and second 56' bidirectional electric motors mounted within the housing 50.
4. First 58 and second 58' worm gears driven by the respective motors 56 and 56'.
5. First 60 and second 60' rotary-to-linear converter mechanisms for translating the bidirectional rotation of the respective worm gears 58 and 58' into rectilinear reciprocation in order to tilt the mirror holder 52 about two orthogonal axes indicated at X—X and Y—Y in FIG. 2.

It will be noted from FIGS. 2 and 3 that the housing 50 comprises a front part 62 and a rear part 64. The front housing part 62 is open rearwardly, and the rear housing part 64 is open forwardly. Joined at their open ends and fastened together in any suitable manner, these housing parts provide in combination an enclosed space for accommodating the motors 56 and 56', worm gears 58 and 58', converter mechanisms 60 and 60', etc.

While the ball-and-socket joint 54 serving as a pivotal connection between housing 50 and mirror holder 52 appears in both FIGS. 3 and 4, the latter figure more aptly reveals its organization. The joint 54 includes a ball 66 formed approximately centrally on the mirror holder 52 and projecting rearwardly therefrom. A socket 68 to mate with the ball is formed in a corresponding position on the front housing part 62. The ball-and-socket joint 54 admits of pivotal motion of the mirror holder 52 relative to the housing 50 in every direction, although in fact the mirror holder pivots only about the two orthogonal axes X—X and Y—Y for reasons hereinafter made apparent.

Preferably, and as shown in FIG. 4, one or more recesses may be formed as at 70 in the socket 68. Slidably engaged in these recesses are arms 72 projecting radially outwardly from the ball 66 and serving to connect the ball to the mirror holder 52. The arms 72 in the recesses 70 are intended to prevent the rotation of the mirror holder about the ball-and-socket joint 54 without interfering with its tilting motion about the axes X—X and U—Y.

Indicated at 73 in FIG. 4 is a water and dust cover in the form of a tubular bellows encircling the spacing between housing 50 and mirror holder 52. The tubular expansible cover 73 is attached at one end to the junction of the front 62 and rear 64 parts of the housing 50 and at the other end to the periphery of the mirror holder 52. Although effective to make the tilting device more water- and dustproof, this cover is optional.

FIG. 2 best illustrates the placement of the two bidirectional motors 56 and 56' within the housing 50. These motors are usually of the direct current variety, electrically connected to an external supply and control circuit via cables 74 and 74'. Although the electrical details are not shown because of their common and well known nature, it is understood that the DC motors 56 and 56' are controlled individually by the vehicle driver seated in the vehicle. He may set the motors into and out of forward or reverse rotation to adjust the angular disposition of the unshown rearview mirror so as to obtain an optimum vision of the rear traffice activity. How the bidirectional rotation of the motors leads to the tilting motion of the mirror about the two orthogonal axes will become apparent as the description proceeds.

Mounted directly on the output shafts of the DC motors 56 and 56' are worms 76 and 76' meshing with worm wheels 78 and 78' to constitute the noted worm gears 58 and 58' respectively. The worm wheels 78 and 78' have their bidirectional rotation transformed into rectilinear reciprocation by the respective converter mechanisms 60 and 60' forming the gist of this invention. The two converter mechanisms are of identical construction. Only one of them, 60, will therefore be described in detail, is being understood that the same description applies to the other 60'. The various parts of the converter mechanism 60' will be identified in the drawings merely by priming the reference numerals used to denot the corresponding parts of the mechanism 60.

Figure 5:
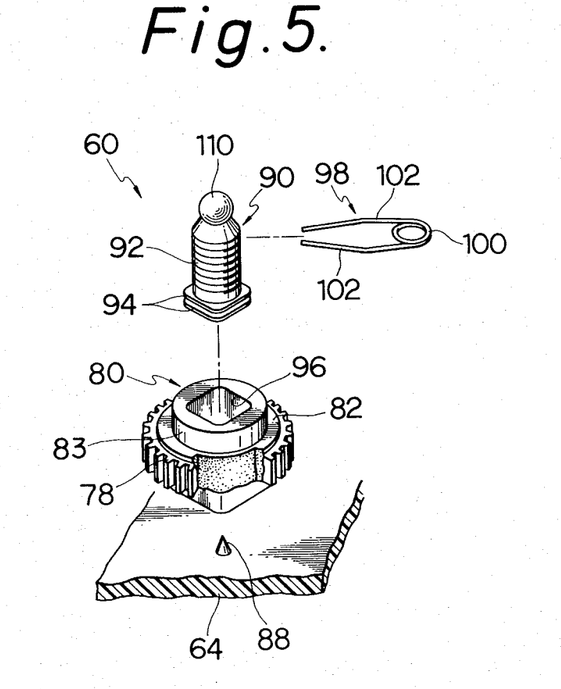
FIG. 5 is an exploded perspective view of the rotary-to-linear converter mechanism in the tilting device of FIGS. 2 through 4.

FIG. 4 best illustrates the representative rotary-to-linear converter mechanism 60 as mounted in position within the housing 50. FIG. 5, on the other hand, depicts the converter mechanism by itself in exploded perspective. It will be discerned from these figures that the worm wheel 78 is formed integral with a hollow rotor 80 in coaxial relation thereto. The worm wheel 78 lies midway between the opposite axial ends of the hollow rotor 80. A step 82 is formed on the front side only of the worm wheel 78. The outer surface 83 of the hollow rotor 80 between its front end and the step 82 is of cylindrical shape. The front end of the hollow rotor 80 is open, whereas, in accordance with a feature of the invention, its rear end is closed with a wall 84 perpendicular to its axis of rotation.

The front part 62 of the housing 50 defines a circular opening 86 in which is rotatably received the cylindrical front end portion 83 of the hollow rotor 80. The rear edge of the front housing part 62 bounding the opening 86 makes sliding contact with the step 82 on the front side of the worm wheel 78. Thus is the open front end of the hollow rotor 80 rotatably supported by the front housing part 62 and thereby restrained from axial displacement in the forward direction.

The closed rear end of the hollow rotor 80, on the other hand, is rotatably held against the inside surface of the rear housing part 64 via a thrust bearing boss 88 in accordance with another feature of the invention. Formed integral with the rear housing part 64 in this particular embodiment, the boss 88 is shown as a small cone, with its pointed tip in contact with the center of the wall 84 closing the rear end of the hollow rotor 80. Notwithstanding the showing of FIGS. 4 and 5, the boss 88 need not be cone-shaped, it being only necessary that the boss have a pointed end for point contact with the end wall 84 of the hollow rotor 80. In this manner the closed of the hollow rotor 80 rotatably makes point contact with the boss 88 on the rear housing part 64 and so is restrained from axial displacement in the rearward direction. It will have been seen, then, that the end wall 84 of the hollow rotor 80 serves the dual purpose of waterproofing the rearview mirror tilting device and making frictionless contact with the pointed tip of the boss 88.

Another important component of the representative rotary-to-linear converter mechanism 60 is a reciprocator 90, which may more aptly be called a plunger in this particular application of the invention. This plunger is screw threaded at 92. Formed integrally with the plunger at its rear end are two relatively thin flanges or sliders 94 of square or otherwise polygonal shape spaced from each other in the axial direction of the plunger. The flanges 94 are slidably fitted in the hollow 96 of the rotor 80, with the plunger 90 partly projecting forwardly of the rotor through its open end. The cross sectional shape of the hollow 96 corresponds to the shape of each flange 94, so that these flanges function to allow the plunger 90 both to rotate coaxially with the hollow rotor and to reciprocate axially relative to same. The use of two flanges or sliders 94 is not an absolute necessity: only one will suffice if it is strong enough to hold the plunger substantially in axial alignment with the hollow rotor and to cause its positive rotation with the rotor.

Slidably engaged in the screw thread 92 of the plunger 90 is a wire spring 98 shaped as pictured in FIG. 5. The spring 98 is coiled a single turn or two at 100 and has its opposite end portions extended approximately in the same direction to provide a pair of spaced apart shanks 102. Spring retainers 104 and 106 integral with the front housing part 62 firmly engage the coil 100, and the ends of the shanks 102, of the spring 98. Thus immovably supported by the front housing part 62, the spring 98 has its shanks 102 slidably received in the screw thread 92 of the plunger 90 on its opposite sides. With the rotation of the plunger 90, therefore, the shanks 102 of the spring relatively slide along its screw thread 92 thereby causing the plunger to travel axially in a forward or backward direction depending upon its direction of rotation.

The front end of the plunger 90, projecting out of the hollow rotor 80 as aforesaid, is pivotally coupled to the mirror holder 52 as via a ball-and-socket joint 108. In the illustrated embodiment the ball-and-socket joint 108 comprises a ball 110 integral with the plunger 90, and a socket 112 on the rear surface of the mirror holder 52.

Such is the construction of the representative rotary-to-linear converter mechanism 60, and of the other converter mechanism 60', embodying the invention. A reference back to FIG. 2 will reveal that the plungers of the two converter mechanisms 60 and 60' are pivotally coupled to the mirror holder 52 at points angularly spaced 90 degrees from each other about the axis of the ball-and-socket joint 54 connecting the mirror holder to the housing 50. The axis X—X passes the joint 54 and the ball-and-socket joint 108', FIG. 3, joining the plunger 90' of the second converter mechanism 60' to the mirror holder 52. The axis Y—Y passes the joint 54 and the ball-and-socket joint 108 connecting the plunger 90 of the first converter mechanism 60 to the mirror holder. It will therefore be understood that the first converter mechanism 60 functions to tilt the unshown rearview mirror about the axis X—X, and the second converter mechanism 60' to tilt the mirror about the axis Y—Y.

In operation, for tilting the mirror holder 52 (or the rearview mirror attached thereto) about the axis X—X, the first DC motor 56 may be set into rotation in a desired direction. The worm 76 on the output shaft of the motor 56 imparts its rotation to the worm wheel 78 and in consequence to the hollow rotor 80 of the first rotary-to-linear converter mechanism 60. With its square flanges 94 fitted in the square sectioned hollow 96 of the rotor 80, the plunger 90 also rotates with the rotor in sliding engagement with the shanks 102 of the wire spring 98 anchored to the front housing part 62. The wire spring 98 acts on the screw thread 92 of the revolving plunger 90 to cause its axial movement in a forward or backward direction depending upon the direction of rotation of the motor 56. Thus moved axially, the plunger 90 tilts the mirror holder 52 in either direction about the axis X—X.

As is self-evident from the foregoing, the engerization of the second DC motor 56' in either direction results, via the second rotary-to-linear converter mechanism 60', in the tilting motion of the mirror holder 52 in corresponding direction about the axis Y—Y. Consequently the tilting device is remotely controllable to adjust the angular position of the rearview mirror about the two orthogonal axes X—X and Y—Y.

Figure 6:
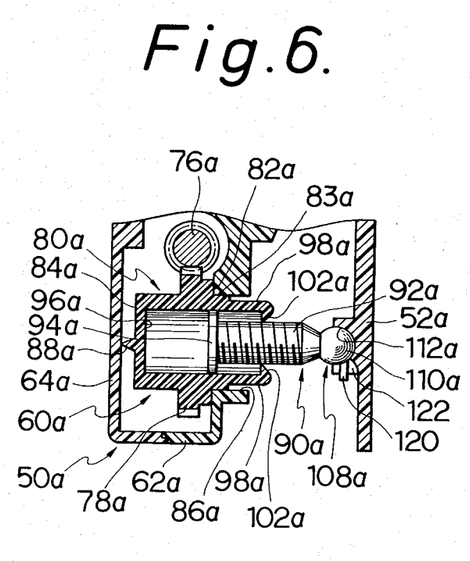
FIG. 6 is a fragmentary sectional view corresponding to FIG. 4 but showing a modified rotary-to-linear converter mechanism in a rearview mirror tilting device.

FIG. 6 shows an alternative form of rotary-to-linear converter mechanism in accordance with the invention. Generally labeled 60a, the alternative converter mechanism is also shown adapted for use in a rearview mirror tilting device in combination with another such mechanism, not shown, as in the preceding embodiment. The converter mechanism 60a also comprises a hollow rotor 80a and a plunger 90a. The hollow rotor 80a is formed integral with a worm wheel 78a in mesh with a motor-driven worm 76a. The worm wheel 78a has a step 82a formed on its front side, raised from the cylindrical outer surface 83a at the front end of the hollow rotor 80a. As in the preceding embodiment this cylindrical front end portion 83a of the hollow rotor is rotatably received in a circular opening 86a in the front part 62a of a housing 50a, with the step 82a in abutment against the edge of the front housing part bounding the opening 86a.

A wall 84a closes the rear end of the hollow rotor 80a. Unlike the preceding embodiment this end wall of the hollow rotor has a thrust bearing boss 88a of conical or like shape formed centrally on its outer or rear surface. The boss 88a makes point contact with the rear part 64a of the housing 50a.

This alternative converter mechanism 60a also differs from the converter mechanism 60 or 60' in that the hollow rotor 80a rotates relative to the plunger 90a; that is, the plunger is locked against rotation relative to a mirror holder 52a. The hollow 96a in the rotor 80a has a circular cross sectional shape and slidably receives a round flange or slider 94a at the rear end of the plunger 90a, thus permitting relative rotation of the rotor and the plunger. The flange 94a of the plunger 90a serves to hold the plunger substantially in axial alignment with the hollow rotor 80a.

In order to cause the axial motion of the plunger 90a the hollow rotor 80a has a plurality of resilient arms 98a projecting forwardly from its open front end at constant angular spacings. The arms 98a terminate in claws 102a directed radially inwardly and slidably engaged in the screw thread 92a of the plunger 90a. The revolution of the claws 102a with the hollow rotor 80a results in the axial motion of the plunger 90a, the plunger itself being locked against rotation by means hereinafter set forth.

The plunger 90a has its front end pivotally coupled to a mirror holder 52a via a ball-and-socket joint 108a. This joint comprises a ball 110a integral with the plunger 90a, and a socket 112a integral with the mirror holder 52a. The ball 110a has a lockpin 120 projecting therefrom and slidably engaged in a recess 122 in the socket 112a. The lockpin 120 functions to prevent the rotation of the plunger 90a relative to the mirror holder 52a without interfering with the desired pivotal motion therebetween. The other details of construction of this modified rearview mirror tilting device will be apparent from the foregoing description of FIGS. 2 through 5.

In operation, as the hollow rotor 80a of the rotary-to-linear converter mechanism 60a rotates in either direction with the worm wheel 78a in mesh with the motor-driven worm 76a, the claws 102a revolve in sliding engagement with the screw thread 92a of the nonrotatable plunger 90a. Thus the plunger travels axially relative to the hollow rotor 80a for tilting the mirror holder 52a. The other details of operation will be understood from the operational description of the preceding embodiment. It will be appreciated that this alternative embodiment is also well calculated to accomplish the objectives pointed out previously.

While but two embodiments of the invention have been shown and described herein, it is understood that additional modifications may well occur to those skilled in the art within the broad teaching hereof. For example, the open front end of the hollow rotor may be rotatably supported not by a continuous annular surface but by a series of discontinuous surface segments in annular arrangement. It is also recognized that the rotary-to-linear converter mechanism of this invention may find applications other than rearview mirror tilting devices. All such modifications, changes or adaptations of the invention may be resorted to without departure from the fair meaning or proper scope of the following claims.

What is claimed is:

1. In a rearview mirror tilting device having a mirror holder (52) and a housing (50), said housing having housing open front and rear parts (62, 64), said housing being adapted and designed for accommodating motors and converter mechanisms, with a ball-and-socket joint (54) serving as the pivotal connection between the housing and the mirror holder, said ball-and-socket joint (54) including a ball (66) affixed approximately centrally on the mirror holder (52) and projecting rearward therefrom, a socket (68) to mate with the ball of said ball-and-socket joint, disposed in a corresponding position on the housing front part (62) so as to provide pivotal motion to the mirror holder (52) relative to the housing (50), in combination:

(a) first and second bidirectional motors (56, 56') within the housing (50), with output shafts, worms (76, 76') connected to said output shafts, meshing with worm wheels (78, 78'), and first and second converter mechanisms (60, 60') so arranged and disposed as to have the bidirectional rotation of the worms transformed into rectilinear reciprocation by the converter mechanisms, hollow rotor means (80) with front and rear parts, said front part being open, said hollow rotor means being formed integral with said worm wheels (78, 78'), said worm wheels being approximately midway between the opposite axial ends of said hollow rotors means (80), a wall rear part disposed at the hollow rotor means rear part perpendicular to its axis of rotation; and, (b) a boss (88) disposed between the hollow rotor means rear part and the housing rear part (64) said boss extending between said wall rear part and said housing rear part (64) being affixed to one of said rear parts and having a pointed tip in contact with the other of said rear parts, so that the closed end of the hollow rotor means (80) make rotatable point contact and is restrained from axial displacement in the rearward direction, said wall rear part (84) serving to waterproof the tilting device and makes frictionless contact between the hollow rotor means (80) and the pointed tip of the boss (88).

2. In a device as claimed in claim 1, including, one or more recesses (70) in the socket (88), arms (72) projecting radially outwardly from the ball (66) serving to connect the ball to the mirror holder (52), said arms (72) preventing rotation of the mirror holder about the ball-and-socket joint (54) without interfering with its tilting motion.

3. In a device as claimed in claim 2, including a front side to said worm wheels, a step (82) formed in said front side, the outer surface (83) of the hollow rotor means (80) between its front part and the step (82) being of cylindrical shape, a circular opening (86) in the front part (62) of said housing, receiving the front part of the hollow rotor means (80), with an edge on said front part (62) of said housing, in contact with the step (82) so that the hollow rotor means (80) is restrained from axial displacement in the forward direction.

4. In a device as claimed in claim 3, including, a reciprocator plunger (90) at least partly screw threaded, said plunger (90) having a front and rear end, the front end being pivotally coupled to said mirror holder (52) via said ball-and-socket joint, slider flanges (94) of square or polygonal shape spaced from each other in the axial direction of the plunger at said rear end, said slider flanges (94) being slidably fitted in the hollow (96) of the hollow rotor means (80) with the plunger partly projecting forwardly of the hollow rotor means through its open end, the cross sectional shape of the hollow (96) corresponding to the shape of the slide flanges (94) so that the slider flanges allow the plunger (90) both to rotate coaxially with the hollow rotor means and to reciprocate axially relative to the same.

5. In a device as claimed in claim 4, including, spring means (104, 106) coupled to the front housing part (62) and engaging the threads of said reciprocator plunger (90).

6. In a device as claimed in claim 5, including having said first and second converter mechanisms (60, 60') pivotally coupled to said mirror holder (52) at points angularly spaced 90° from each other about the axis of the ball-and-joint socket.

7. In a remotely controlled rearview mirror tilting device or the like, a mechanism for converting bidirectional rotation into rectilinear reciprocation, comprising:
 (a) stationary means having a circular opening defined therein:
 (b) a hollow rotor open at one end and closed at the other, the open end of the rotor being rotatably engaged in the opening in the stationary means and thereby restrained from axial displacement in a first direction;
 (c) point contact means for providing point contact between the stationary means and the closed end of the rotor, the closed end of the rotor being rotatably held against the stationary means via the point contact means and thus restrained from axial displacement in a second direction opposite to the first direction;
 (d) a reciprocator mounted in the hollow rotor for sliding motion in its axial direction, the reciprocator being at least partly screw threaded; and,
 (e) means rotatable relative to the reciprocator and slidably engaged in its screw threaded part to cause its rectilinear reciprocation in response to the bidirectional rotation of the hollow rotor.

8. A converter mechanism as claimed in claim 7, wherein the point contact means comprises a boss formed on either of the stationary means and the closed end of the rotor and having a pointed tip for point contact with the other stationary means and the closed end of the rotor.

9. A converter mechanism as claimed in claim 8, wherein the boss is cone shaped.

10. A remotely controlled rearview mirror tilting device comprising:
 (a) a housing;
 (b) a mirror holder pivotally mounted on the housing for tilting motion about two orthogonal axes;
 (c) two bidirectional motors mounted within the housing;
 (d) two worms driven one by each motor
 (e) two worm wheels in mesh one with each worm; and,
 (f) two rotary-to-linear converter mechanisms for translating the bidirectional rotation of the respective worm wheels into rectilinear reciprocation in order to tilt the mirror holder about the two orthogonal axes relative to the housing, each rotary-to-linear converter mechanism comprising:
  (1) a hollow motor rotatable with one of the worm wheels, the rotor being open at one end and closed at the other, the open end of the rotor being rotatably engaged in an opening in the housing and thereby restrained from axial displacement in a first direction;
  (2) point contact means for providing point contact between the housing and the closed end of the rotor, the closed end of the rotor being rotatably held against the housing via the point contact means and thus restrained from axial displacement in a second direction opposite to the first direction;
  (3) a plunger mounted in the rotor for sliding motion in its axial direction and having one end projecting from its open end, the projecting end of the plunger being pivotally coupled to the mirror holder at a point on one of the two orthogonal axes, the plunger being screw threaded; and,
  (4) means rotatable relative to the plunger and slidably engaged in its screw threads to cause its rectilinear reciprocation in response to the bidirectional rotation of the rotor.

11. The rearview mirror tilting device as claimed in claim 10, wherein the point contact means of each rotary-to-linear converter mechanism comprises a boss formed on either of the housing and the closed end of the rotor and having a pointed tip for point contact with the other of the housing and the closed end of the rotor.

12. The rearview mirror tilting device as claimed in claim 11, wherein the boss is cone shaped.

* * * * *